July 17, 1928.

A. WEAVER 1,677,157

SYSTEM FOR MEASURING CONTACT REBOUNDING

Filed Feb. 25, 1925

INVENTOR
A. Weaver
BY
ATTORNEY

Patented July 17, 1928.

1,677,157

UNITED STATES PATENT OFFICE.

ALLAN WEAVER, OF BROOKLYN, NEW YORK, ASSIGNOR TO AMERICAN TELEPHONE AND TELEGRAPH COMPANY, A CORPORATION OF NEW YORK.

SYSTEM FOR MEASURING CONTACT REBOUNDING.

Application filed February 25, 1925. Serial No. 11,539.

This invention relates to methods of and means for measuring the number of rebounds of contacts, and more particularly the so-called "chatter" of relay contacts.

When a relay operates, the armature has a tendency to rebound, due to such causes as resiliency, velocity, etc. In the common language of the art this rebounding is termed "chatter". As will be readily understood, each rebound or chatter has practically the same effect upon the contacts of a telegraph relay, for instance, as an additional operation of the relay. In designing relay armatures and contacts and in comparing the operation of relays, to take two examples, it is of importance that the measure of the chatter or, in other words, the number of the rebounds upon a single operation of the relay be ascertained. Heretofore, the oscillograph method has been the standard method employed for taking similar measurements.

Applicant's invention provides a method of measuring the number of rebounds which is superior to the oscillograph method in that the ease of operation is greater and the speed of operation increased, and in that chatters of higher frequencies can be measured with accuracy.

Applicant's device consists broadly of electrical means for accomplishing the automatic registration upon a suitable indicating device of the number of rebounds of two contacts when the same are brought together in the operation of a relay or other device.

Figure 1:
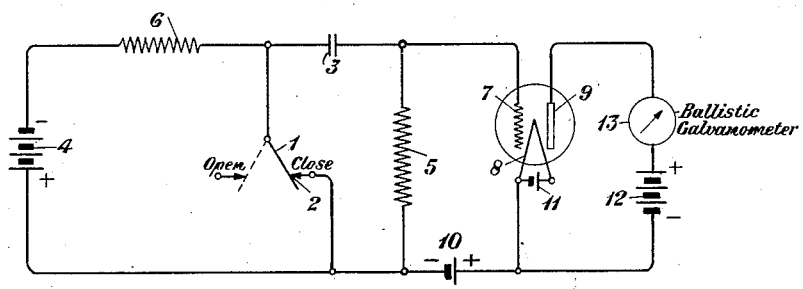
Figure 2:
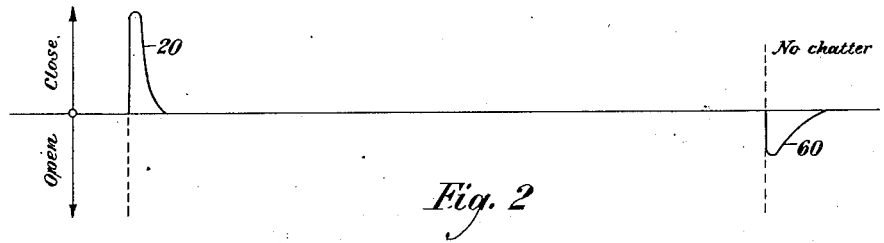
Figure 3:
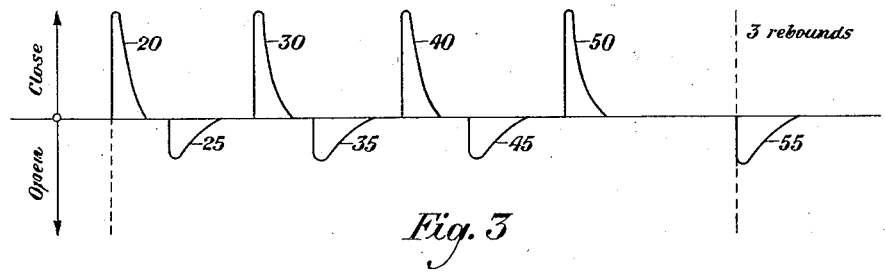

The invention will be clearly understood from the following detailed description of one desirable form of applicant's device and the operation thereof when the same is read with reference to the accompanying drawing. Figure 1 of the drawing is a circuit diagram of the chatter meter; Fig. 2 represents diagrammatically the current impulses occurring in the circuit upon the operation of the relay without chatter; and Fig. 3 represents in like manner the current impulses produced in the circuit by an operation followed by three chatters of the contacts.

With reference to the details of the drawing, the armature 1 is shown in the closed position of the circuit, making contact at 2, and the dotted line indicates the position of the armature when the contact is open. Let it be assumed that the relay is operated at a given frequency, say, 16 cycles. While the contact is open, the condenser 3 is charged to the potential of battery 4. Upon the operation of the relay and the closing of the contact at 2, the condenser 3 will discharge through the resistance 5. The resulting current impulse is represented by the curve 20 of Figs. 2 and 3. If there is no chatter, that is, no rebounding, of the armature 1, the contact will be opened again one-half period later, and the battery 4 will charge the condenser 3 through the resistances 5 and 6. This charging current is represented by the curve 60 of Fig. 2. On the other hand, if there are three chatters, the current impulses will be as shown in Fig. 3, represented by the curves 20, 25, 30, 35, 40, 45, 50, and 55, as will be more fully explained below.

There is included in the system as a rectifier and amplifier a thermionic vacuum tube with grid 7, filament 8, and plate 9. The grid, filament, and plate batteries are shown at 10, 11, and 12, respectively. The poling of the grid battery 10, the plate battery 12, and the battery 4, referred to above, is to be noted. A ballistic galvanometer 13 is included in the plate circuit.

Due to the poling of the battery 10, there is normally impressed upon the grid 7 a negative potential. As will be well understood by those skilled in the art, given this normally negative potential on the grid, the added application of a negative potential to the grid will have no effect on the plate circuit, whereas the application of a positive potential to the grid will produce a current impulse in the plate circuit, in which is included the ballistic galvanometer 13.

Upon the closing of the relay contact and the discharge of the condenser 3, the current impulse through the resistance 5 causes a positive potential to be applied to the grid 7, which in turn produces a current impulse through the galvanometer 13 in the plate circuit. When the contact opens, the condenser-charging current through resistance 5 causes a negative potential to be impressed upon the grid 7. As stated above and as will be understood from an examination of the poling of battery 10 in Fig. 1 of the drawing, this negative potential on the grid will not produce a current impulse in the plate circuit and the galvanometer, since the grid is already made sufficiently negative by the battery 10 to prevent any current in the plate circuit.

From the above description and explanation it is readily understood that the ballistic galvanometer 13 receives a current impulse each time the contact closes and no current impulse when the contact opens. Since the deflection of the galvanometer needle will be proportional to the number of impulses through the instrument and since there is one impulse in the plate circuit to each closing of the contact, it follows that the deflection of the galvanometer needle will likewise be proportional to the number of times the contact closes.

If there is no chatter of the relay contact, that is, no rebounding of the armature, the galvanometer will receive one impulse per cycle of relay operation and will show a certain deflection, the amount of this deflection depending upon the frequency of operation of the relay. If, however, the relay chatters once, this chatter or rebounding being equivalent to a second operation of the relay, the deflection of the galvanometer will be twice as great as in the case of no chatter. Likewise, if there are two chatters or rebounds, the deflection of the galvanometer will be three times as great as in the first case, and so on. Accordingly, the number of chatters may be ascertained by taking the observed deflection, dividing this deflection by the amount of deflection corresponding to the base frequency, and subtracting 1. More specifically, given the base frequency of 16 cycles, assumed above, and a corresponding galvanometer needle deflection of $x$, if the relay chatters three times, the number of chatters will be ascertained by the use of the following equation, in which C is the number of chatters and D is the total observed deflection:

$$C = \frac{D}{x} - 1$$

Since, as explained above, D will be proportional to the number of times the contact closes, D must, given a deflection $x$ corresponding to the base frequency, be equal to $4x$. Therefore, substituting in the above equation, we have $$C = \frac{4x}{x} - 1 = 4 - 1 = 3,$$

or the number of chatters.

Unsteady reading on the galvanometer will indicate a variable amount of chatter, and steady reading will indicate systematic chatter.

It will be understood, of course, that the values of the condenser and the resistances in the circuit should be chosen so that the time of charging or discharging of the condenser will be shorter than the time during which the contact is open upon the fastest chatter to be observed.

Applicant does not limit himself to the form of system, described in detail above, nor to the specific use of his meter explained above, but claims as his invention the following:

What is claimed is:

1. As a means for measuring the number of rebounds of contacts, a system comprising a thermionic vacuum tube, a ballistic galvanometer included in the plate circuit of said thermionic vacuum tube, and circuit arrangements whereby each closing of the contacts produces a current impulse in said plate circuit and an opening of the contacts has no effect on said plate circuit.

2. A system for measuring the number of rebounds of contacts, said system comprising a thermionic vacuum tube, a ballistic galvanometer included in the plate circuit of said thermionic vacuum tube, means whereby each closing of the contacts produces a current impulse in said plate circuit, and means whereby the opening of the contacts is prevented from affecting the ballistic galvanometer.

3. A system for measuring the number of rebounds of contacts, said system comprising a thermionic vacuum tube, a ballistic galvanometer in the plate circuit of said thermionic vacuum tube, a source of energy so poled as to impress a normal negative potential on the grid of said thermionic vacuum tube, means for impressing a positive potential on said grid in response to each closing of the contacts, said positive potential producing a current impulse in the plate circuit of the therminoic vacuum tube and the ballistic galvanometer included therein, and means for preventing the affecting of the plate circuit upon the opening of the contacts.

4. As means for measuring the number of rebounds of contacts, a network comprising a battery, a condenser, and a plurality of resistance elements; a thermionic vacuum tube comprising a grid circuit, a plate circuit, and a filament circuit; a battery in said grid circuit so poled as normally to impress a negative potential on the grid; and a ballistic galvanometer included in said plate circuit said network being so associated with the contacts and with the grid circuit that the opening of the contacts has no effect on the plate circuit and the included ballistic galvanometer, but the closing of the contacts effects the discharge of the condenser and said discharge impresses a positive potential on the grid, which in turn produces a current impulse in the plate circuit and the ballistic galvanometer included therein.

5. The method of measuring the number of rebounds of contacts which consists in accumulating a quantity of electrical energy, causing the initial closing of the contacts to discharge said energy to produce a basic indication, causing subsequent closing of the contacts to produce an indication readily comparable with said basic indication, and comparing the basic indication with the indication subsequently produced.

6. The method of measuring the number of rebounds of contacts which consists in accumulating a quantity of electrical energy, discharging said energy in response to the initial closing of the contacts, causing the energy so discharged to produce a basic indication, re-accumulating the quantity of electrical energy each time the contacts re-open, discharging the accumulated energy in response to each re-closing of the contacts, causing the discharged energy to render the indication cumulescent, and observing the relation between the final indication and the basic indication.

In testimony whereof, I have signed my name to this specification this 21st day of February 1925.

ALLAN WEAVER.